(12) United States Patent
Farag et al.

(10) Patent No.: US 12,272,056 B1
(45) Date of Patent: Apr. 8, 2025

(54) STABLE VISUALIZATION OF TUBULAR OBJECTS BY THE FLY-IN METHOD WITH APPLICATIONS TO COMPUTED TOMOGRAPHY COLONOGRAPHY

(71) Applicant: Kentucky Imaging Technologies, LLC, Louisville, KY (US)

(72) Inventors: Aly Farag, Louisville, KY (US); Salwa Elshazly, Louisville, KY (US)

(73) Assignee: Kentucky Imaging Technologies, LLC, Louisville, KY (US)

( * ) Notice: Subject to any disclaimer, the term of this patent is extended or adjusted under 35 U.S.C. 154(b) by 368 days.

(21) Appl. No.: 17/899,185

(22) Filed: Aug. 30, 2022

Related U.S. Application Data

(60) Provisional application No. 63/239,982, filed on Sep. 2, 2021.

(51) Int. Cl.
*G06T 7/00* (2017.01)
*G06T 15/08* (2011.01)
*G06T 17/20* (2006.01)

(52) U.S. Cl.
CPC ............ *G06T 7/0012* (2013.01); *G06T 15/08* (2013.01); *G06T 17/20* (2013.01); *G06T 2207/10072* (2013.01); *G06T 2207/30028* (2013.01)

(58) Field of Classification Search
CPC ....... G06T 7/0012; G06T 15/08; G06T 17/20; G06T 2207/10072; G06T 2207/10068
See application file for complete search history.

(56) References Cited

U.S. PATENT DOCUMENTS

| | | | |
|---|---|---|---|
| 8,014,561 B2 | 9/2011 | Farag et al. | |
| 8,041,141 B2 | 10/2011 | Farag et al. | |
| 9,727,963 B2 | 8/2017 | Mintz et al. | |
| 10,242,488 B1 * | 3/2019 | Farag ................... | G06T 19/003 |
| 10,796,432 B2 | 10/2020 | Mintz et al. | |
| 11,140,759 B2 | 10/2021 | Otten et al. | |
| 11,151,789 B1 * | 10/2021 | Farag ................... | G06T 7/0014 |
| 11,510,750 B2 | 11/2022 | Dulin et al. | |
| 2002/0061131 A1 | 5/2002 | Sawhney et al. | |
| 2003/0223627 A1 * | 12/2003 | Yoshida ................ | G06T 7/155 |
| | | | 382/128 |
| 2008/0018646 A1 | 1/2008 | Farag et al. | |

(Continued)

FOREIGN PATENT DOCUMENTS

| | | | | |
|---|---|---|---|---|
| AU | 2014311712 A1 * | 3/2016 | ......... | A61B 5/02007 |
| CA | 2368390 C * | 7/2010 | ............ | G06K 9/209 |

OTHER PUBLICATIONS

M. Mohamed, et al., "Fly-In Visualization for Virtual Colonoscopy," 2018 25th IEEE International Conference on Image Processing (ICIP), Athens, Greece, 2018 (Year: 2018).*

(Continued)

*Primary Examiner* — Shaghayegh Azima
(74) *Attorney, Agent, or Firm* — Law Office of J. L. Simunic; J. L. Simunic

(57) ABSTRACT

The present development is a method for providing stable visualization of tubular objects. The method simplifies visualization using a Fly-Ln approach without loss of internal surface details. The method uses graphical programming, and can be easily integrated with commercially available visualization programs, such as Virtual Colonoscopy (VC) or Computed Tomography Colonography (CTC).

5 Claims, 4 Drawing Sheets

(56) References Cited

U.S. PATENT DOCUMENTS

| | | | |
|---|---|---|---|
| 2008/0069419 A1* | 3/2008 | Farag | G06T 19/003 |
| | | | 382/131 |
| 2008/0118117 A1* | 5/2008 | Gauldie | A61B 6/032 |
| | | | 382/128 |
| 2014/0146044 A1* | 5/2014 | Cvetko | G06T 7/0012 |
| | | | 345/419 |
| 2017/0084027 A1 | 3/2017 | Mintz et al. | |
| 2018/0093419 A1 | 4/2018 | Lappas et al. | |
| 2020/0129048 A1* | 4/2020 | Hamm | A61B 1/00066 |
| 2020/0319031 A1 | 10/2020 | Hong et al. | |
| 2021/0346115 A1 | 11/2021 | Dulin et al. | |
| 2022/0383602 A1 | 12/2022 | Kopf et al. | |

OTHER PUBLICATIONS

M. Mohamed, et al., "Fly-In Visualization for Virtual Colonoscopy," 2018 25th IEEE International Conference on Image Processing (ICIP), Athens, Greece, (Year: 2018).*

* cited by examiner (a) original 3D reconstructed colon b) Real 3D colon after cylinderization (c) visualization using Fly-In in original colon and in cylinderized colon

STABLE VISUALIZATION OF TUBULAR OBJECTS BY THE FLY-IN METHOD WITH APPLICATIONS TO COMPUTED TOMOGRAPHY COLONOGRAPHY

CROSS-REFERENCE TO PRIOR APPLICATIONS

The present application claims priority to U.S. Patent Application 63/239,982 filed 2 Sep. 2021, which is incorporated by reference in its entirety.

STATEMENT REGARDING FEDERALLY SPONSORED RESEARCH OR DEVELOPMENT

This invention was made without federal support.

NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not applicable.

STATEMENT REGARDING PRIOR DISCLOSURES BY AN INVENTOR OR JOINT INVENTOR

The subject matter of the instant invention was described in an article authored by the present inventors entitled "Stabilizing Visualization by Reducing Camera Movements in Virtual Colonoscopy Methods" published in Computer Methods in Biomechanics and Biomedical Engineering: Imaging & Visualization, 9:3, 253-260. Authors S. Elshazly and A. Farag are inventors on this application.

FIELD OF THE INVENTION

The invention relates to a method for providing a stable visualization of tubular objects using graphical programming.

BACKGROUND OF THE INVENTION

Visualization of the inner surface of tubular objects is a necessary and common practice for numerous applications, such as in virtual colonography in medical applications. Whereas some tubular shapes can have known dimensions, e.g., industrial parts, the structures of other tubular objects must be inferred through sensors and reconstructed numerically by computer models. For example, 3D representations must be generated through manipulating sensory information gathered by various known techniques in the image analysis and computer vision literature to generate anatomical models of the human body.

In biomedical applications visualization is often part of a multistage system that uses sensors to extract data from the object e.g., a part of the human body, from which methodologies are applied to build a three-dimensional (3D) description of the topology of interest. Over the past four decades, computerized biomedical imaging modalities such as positron emission tomography (PET), magnetic resonance imaging (MRI) and computed tomography (CT) have evolved to enable precise 3D modeling of the human anatomy. For example, for Computed Tomography Colonography (CTC), an abdominal CT scan of prepped patients is performed, from which a 3D model is generated. Recently, the inventors developed a "Fly-In" method for visualization of tubular objects, such as the colon. The Fly-In method uses a virtual camera rig arranged in a specific pattern within a tubular object's inner surface, such as the brain vascular tree, the trachea and colon. The number of cameras in the rig can be varied such that the regions within each frustum—the field of view (FOV) of each camera—maps the curved region into a nearly distortionless 2D image. The patched images in the rig's far-field (i.e., the tubular object's seen region) frusta constitutes unfolding of the ring into a filet. A precise selection of the cameras can lead into a nearly distortionless filet. Therefore, navigation of the rig on the centerline as datum would establish a piecewise unfolding of the tubular object, exposing its surface details with accuracy and speed.

The Fly-In (FI) method is general and is applicable to any tubular object regardless of its topology. The rig can be virtual for preconstructed 3D objects and their centerline. It can also be a physical entity (e.g., a miniaturized robot of various forms, including a flying drone for empty tubular objects, or a miniaturized submarine if the tubular object is filled with liquid). In biomedical applications, Fly-In has endless applications in image-guided interventions, including but not limited to Virtual Colonoscopy (VC) or Computed Tomography Colonography (CTC).

Using the Fly-In method, cameras move along the centerline of the tubular object. The orientation of each camera depends on camera position vector and is controlled by look-at vector ($\overrightarrow{look}$) and view-up vector ($\overrightarrow{up}$). Some tubular objects, such as the colon, by nature has bending and torsion. Therefore, look-at and view-up vectors are changed at each position along the centerline. Due to the unsmooth camera movement, each consecutive pair of images could have large differences in the captured sequence of images. When the individual images are combined to form a composite image, the erratic variations can be difficult to view and may result in missed variances in the image. For example, a radiologist may fail to notice colonic polyps while viewing the composite image of the colon.

In order to overcome this problem, tubular object bending and torsion should be eliminated before visualization. In other words, the look-at and view-up vectors should be constant regardless the camera position. The method of the present invention provides a stable visualization of tubular objects using graphical programming.

SUMMARY OF THE PRESENT INVENTION

The present development is a method for providing stable visualization of tubular objects. The method simplifies visualization using a Fly-In approach without loss of internal surface details. The method uses graphical programming, and can be easily integrated with commercially available visualization programs, such as Virtual Colonoscopy (VC) or Computed Tomography Colonography (CTC). Although described herein for use with the Fly-In approach, the stabilization methodology described herein is applicable to all centerline-based methods, such as without limitation, Fly-Over and Differential Fly-Through methods.

BRIEF DESCRIPTION OF THE FIGURES

FIGS. 3A-3D show simulated images of surface details in a tubular object using the Fly-In method, wherein FIG. 3A shows a cylindrical region of interest (ROI) generated from a rig with eight cameras, FIG. 3B shows the cylindrical ROI of FIG. 3A as a strip, FIG. 3C shows details of a polyp-like structure located within the ROI of FIG. 3A, and FIG. 3D shows details of a surface anomaly located within the ROI of FIG. 3A; and, FIG. 4 is a schematic view demonstrating the impact of camera stabilization by embedding the centerline of the colon to a 2D plane, wherein (a) shows the original 3D reconstructed colon, (b) shows the colon using the stabilization method of the present invention, and (c) is a graphical comparison of the Fly-In results before applying the stabilization method and after applying the stabilization method.

DETAILED DESCRIPTION OF THE PRESENT DEVELOPMENT

The present development is method to minimize erratic movement in a visualization frustum while following a colon topology. The method comprises a mathematical approach and its algorithmic implementation to correct the cameras' movement during navigation inside tubular shapes off the centerline, as datum of navigation, through novel registration of the region of interest of visualization into a two-dimensional plan (one-dimensional line). The transformation involved in the registration process embeds the 3D tubular object into a 2D plane/1D line, thus the original topology is transformed into a cylinder-like which simplifies the visualization, with close to zero visualization loss.

As is known in the art, the Fly-In method uses a disk-like rig of virtual cameras centered on a centerline of a reconstructed colon, providing 360° visualization of a cylindrical region of interest (ROI). When images from the virtual cameras are projected, a "filet"-like display of the internal surface of the ROI is produced. By moving the ROI along the centerline of the colon, radiologists are able to examine the luminal surface and detect colonic polyps. Further, by adjusting the visualization frustum for the cameras the size of the displayed ring and resolution can be controlled.

As is further known in the art, a 3D mesh consists of a set of connected polygons constructing a surface. An element in the visualized surface face is called a cell. Optimal visualization projects most of the mesh cells on the image plane without local deformations or loss. This implies that the images of the cells, which have the same areas, have the same number of pixels regardless their orientations, i.e., normal vectors (n), or positions on the surface.

Figure 1:
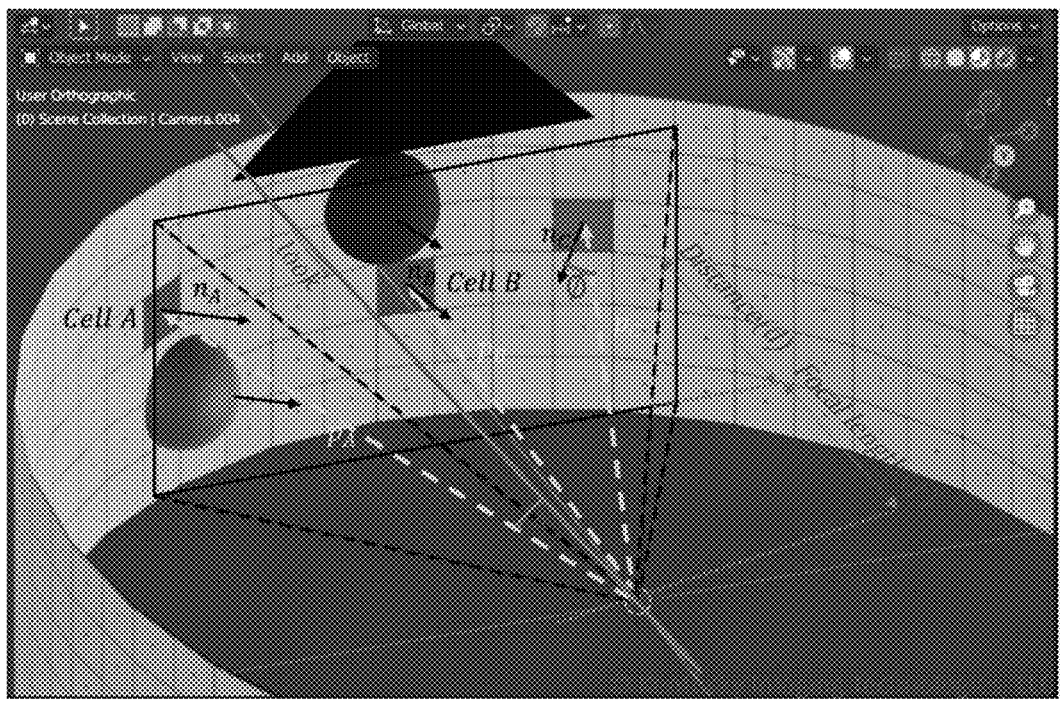
FIG. 1 is a schematic view demonstrating the camera geometry showing indicating the principal axis look, projection direction p, surface normal n and distance d, for the visualization frustrum for one camera.

A visualization loss measure ($L_v$) for a cell under a perspective projection is defined as a function of three factors: (a) the angle ($\alpha$) between the projection direction (p) and the camera's principal axis ($\overrightarrow{look}$); (b) the angle ($\emptyset$) between the projection direction (p) and the cell's normal vector (n); and, (c) the ratio between the camera focal length (f) and the cell's distance (d) to the projection center on the direction of $\overrightarrow{look}$. FIG. 1 provides a schematic view showing each of these elements relative to the virtual camera. Given the unit vectors $\vec{n}_c$ and $\vec{p}_c$ and distance $d_c$, the loss measure $L_v$ for a cell c is calculated by Equation 1:

$$L_v(n_c, p_c) = g(f/d_c)(\overrightarrow{look} \cdot \vec{p}_c)(\vec{n}_c \cdot \vec{p}_c) + 1 \quad (1)$$

where $g(f/d_c)$ encodes the optimal viewing distance. A cell c with a smaller distance $d_c$ will have a bigger image than a cell with a larger distance.

Figure 2:
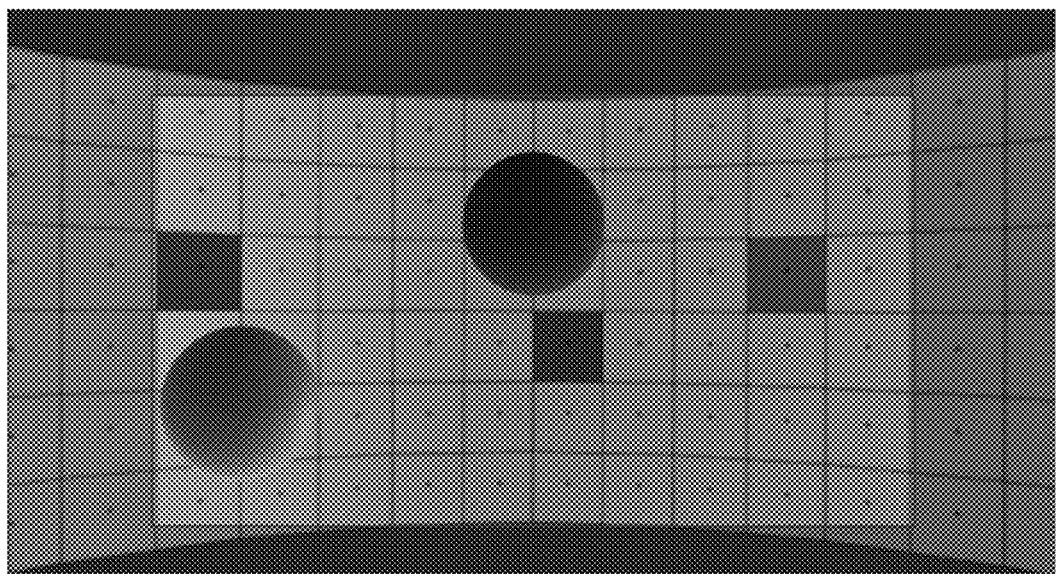
FIG. 2 is a schematic view of a Fly-In image captured by the camera of FIG. 1.

As shown in FIG. 2, when the images from the virtual cameras are projected in a Fly-In view, cells closer to the vector $\overrightarrow{look}$ appear larger than they are, and cells with smaller angles $\alpha$ and $\emptyset$ have larger images in the Fly-In domain. Because of the way images are captured, a single cell may appear in the field of view of adjacent cameras and may have different appearances depending on the vector and angles relative to the camera.

Usually, $d_c > f$ but to ensure that the term's value is in the range [0, 1], we use a limiter function $g(\cdot)$. The quantity ($\overrightarrow{look} \cdot \vec{p}_c$) encodes the translation of a cell from the camera center. If the cell is exactly in front of the camera (i.e., $\alpha=0$) this term will be 1 and will decrease as the cell is shifted until the term reaches zero at $\alpha=\pi/2$. For a visible cell, the value of the dot product ($\overrightarrow{look} \cdot \vec{p}_c$) is in the range [0, 1]. The quantity ($\vec{n}_c \cdot \vec{p}_c$), encodes the orientation of a cell with respect to the direction of the projection. If the cell orientation is in the direction of the projection (i.e. $\vec{n}_c = -\vec{p}_c$ or $\emptyset=\pi$), this term will equal minus one (−1) and will increase as the cell is rotated until the term reaches zero at $\emptyset=\pi/2$. For a visible cell, the value of the dot product ($\vec{n}_c \cdot \vec{p}_c$) is in the range [−1, 0]. A cell will have a best visualization if the multiplication of these three terms equals −1. Therefore, to represent zero loss, a bias one (1) is added to the multiplication factor and the range of the proposed loss measure $L_v(n_c, p_c)$ will be [0,1].

For graphical comparison, the visualized surface is defined as a percentage using the cumulative normalized function $F_{L_v}$ which is calculated using Equation 2:

$$F_{L_v}(x) = \frac{1}{|C|} \sum_{c \in C} u(x - L_v(n_c, p_c)), \quad 0 \le x \le 1 \quad (2)$$

wherein C is a set of cells of a surface and $u(\cdot)$ is a unit-step function.

Figure 3A:
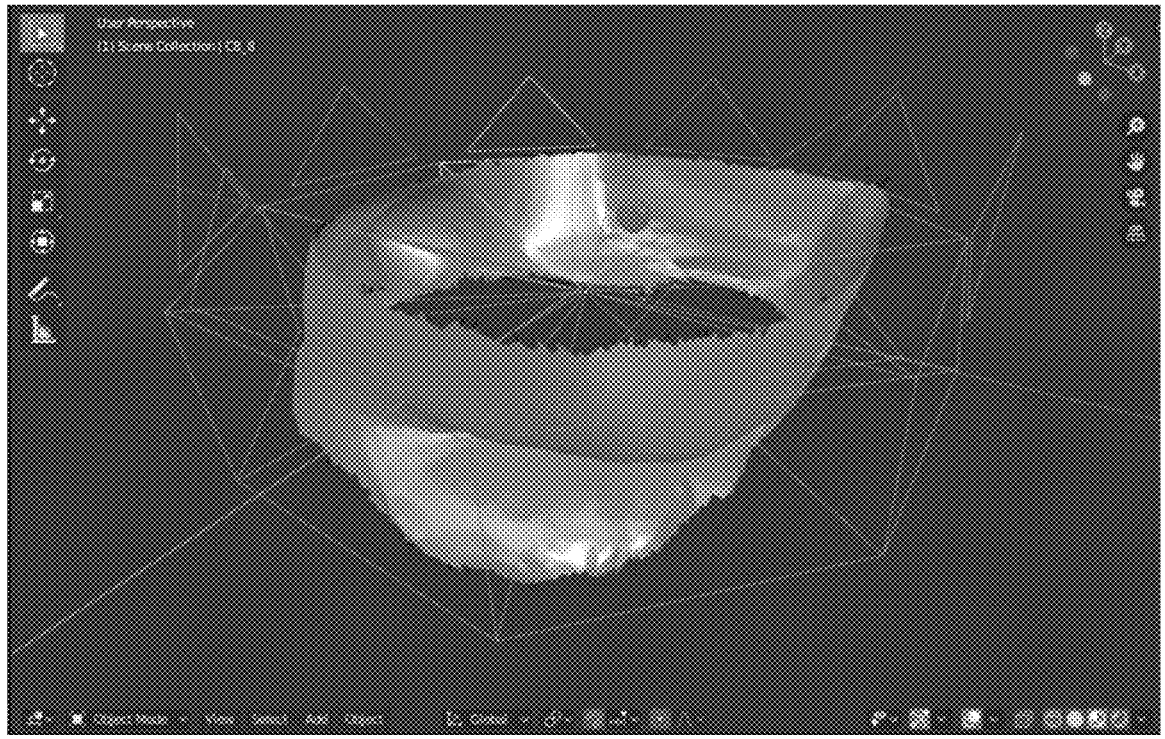
Figure 3B:
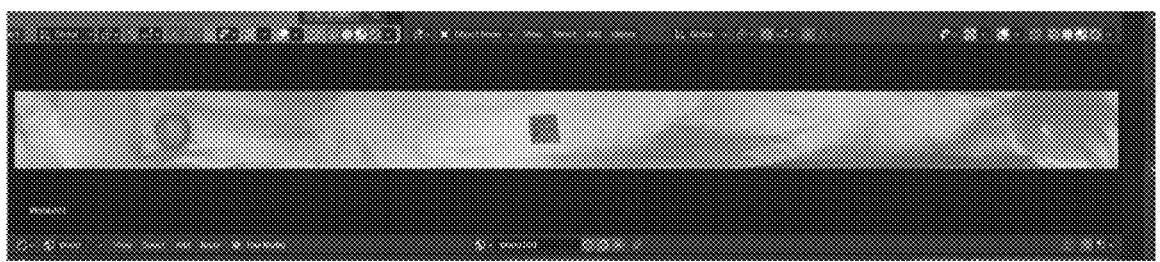
Figure 3C:
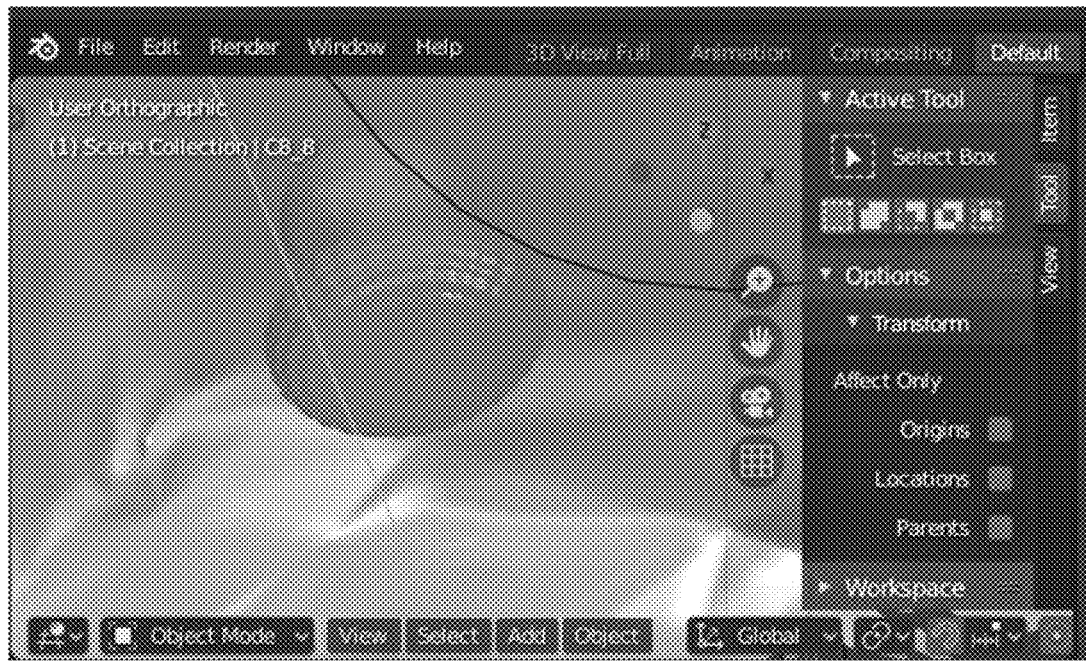
Figure 3D:
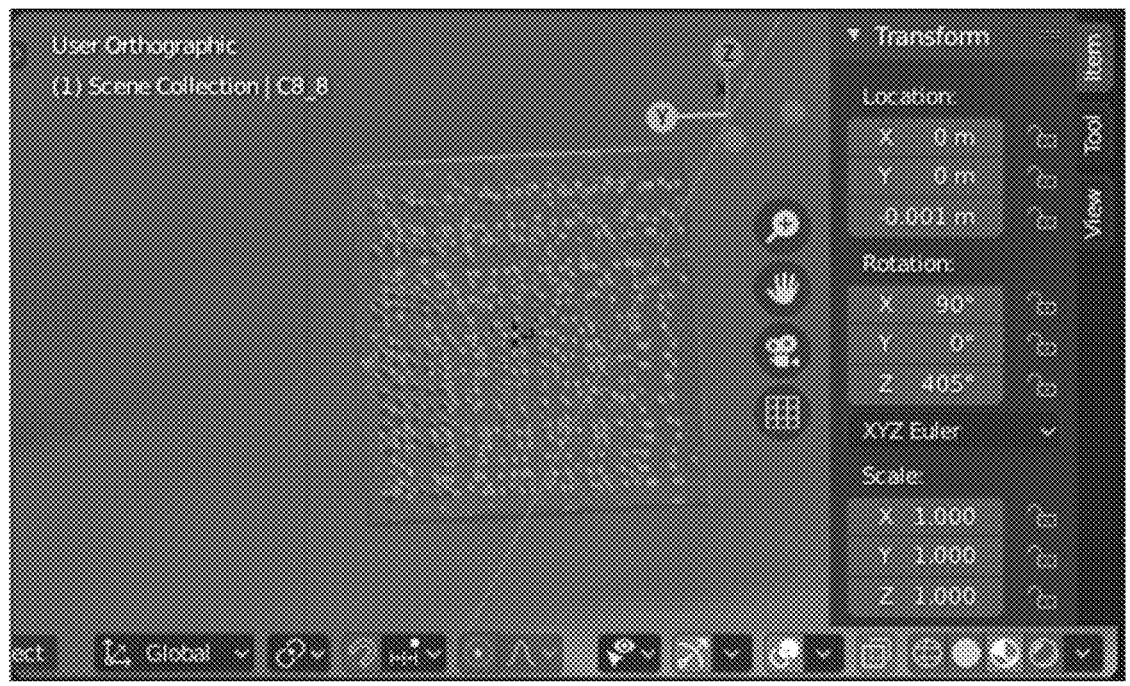

FIGS. 3A-3D show simulated images of surface details in a tubular object using the Fly-In method. FIG. 3A shows a cylindrical region of interest (ROI) generated from a rig with eight cameras. For best viewing of the ROI, the cylindrical region is artificially cut and viewed as a strip, as shown in FIG. 3B, rather than as a closed loop as shown in FIG. 3A. The strip can then be evaluated for deviations from a normal surface, which is represented in FIGS. 3A-3D as a relatively smooth surface. For example, FIG. 3C shows details of a polyp-like structure located within the ROI of FIG. 3A and FIG. 3D shows details of a surface anomaly, such as a plurality of small nodules, located within the ROI of FIG. 3A. However, although the Fly-In method can be highly effective for visualizing anomalies within a relatively narrow cylindrical ROI, these same anomalies can be more difficult to locate when the tubular object is bent or twisted or includes hidden sections, such as the colon. Further, because the Fly-In cameras move along the centerline of the colon and acquire images at various points along the centerline, if the centerline is not in the same xyz-plane for sequential images—that is, if the centerline includes a bend—then there may be significant changes in the look-at vector ($\overrightarrow{look}$) and view-up vector ($\overrightarrow{up}$) between sequential images creating jarring visual transitions, which can be burdensome to the viewer.

The present invention applies colon unfolding, or cylinderization, to images acquired during virtual colonoscopy using centerline-based methodology, such as the Fly-In method. Applying the colon unfolding reduces the risk of missing anomalies within a twisted tubular object by converting the object to a shape similar to a cylinder. This allows for easier viewing of all segments of the tubular object and smooths the transitions between sequential images making viewing easier. The present invention improves up on the colon unfolding procedure by transforming the centerline points to fit on a plane or on a line, referred to herein as "camera stabilization".

Camera stabilization minimizes erratic movement in the visualization frustum with close to zero visualization loss. This is accomplished by reducing or eliminating colon bending and torsion before visualization by decreasing the degrees of freedom for the camera's look-at ($\overrightarrow{look}$) and view-up ($\overrightarrow{up}$) vectors.

As is known in the art, colon unfolding is a data manipulation process that results in constant $\overrightarrow{look}$ and $\overrightarrow{up}$ vectors regardless of camera position. To keep the vectors constant, all points of the centerline are made co-linear and the colon is represented as a set of cylinders wherein adjacent cylinders have the same longitudinal axis. After each cylindrical section is aligned to the centerline, each cylindrical ROI or colon ring mesh is aligned with its neighbors. Although not required, adjacent cylinders may have different radii, defined as the distance between the centerline and the cylinder inner surface. The colon rings may then undergo stretching and torsion.

In the present method, to model and measure the torsion, rotation minimizing frames (RMF) are used as a reference. First, a generalized cylinder is fitted for each colon ring mesh, whose corresponding line segment is modeled by a parametrized line c(s), 0≤s≤1. The gradient decent equation for fitting the radius function r(s) is given by Equation 3:

$$\Delta r = -r(s) + \frac{1}{N}\sum_i \|c(s) - v_i\| - \mu r''(s), \quad (3)$$

where $v_i$ are N mesh vertices of the ring whose projection to the centerline are close to c(s).

After fitting the generalized cylinder to a ring mesh having mesh vertices, the RFMs are computed to generate the initial director frames {T(s),U(s),V(s)}. Then each mesh vertex is parametrized by (s,σ), where σ is given by the rotation angle of the vector $v_i$–c(s), about T(s) measured about the U(s) axis. The original parametrization of $v_i$ before deformation is denoted as ($s^0$, $\sigma^0$). The angle β(s) is the angle of rotation between the director frames and the centerline's RMF. After deformation, $$\beta(s) = 1/N \sum_{i=1}^{N} \sigma_i - \sigma_i^0.$$

The torsion energy is then modeled by Equation 4:

$$E_T = \int_0^1 \beta'(s)^2 ds \quad (4)$$

An optimization method is then used to find the best 3D mesh that satisfies the smallest torsion energy.

After transforming the centerline and the colon 3D mesh, a path for camera rig movement along the centerline is established. The path is defined as a plurality of neighboring positions along the centerline, so the camera can be moved along the centerline to obtain a complete image of the colon. The path must be selected such that the virtual camera has a translation parallel to the centerline. Thus, the camera look-at vectors will differ depending on the visualization method being used. To generate a complete image of the colon, the virtual camera is moved along the path, and the camera stabilization process is repeated at each camera stop.

Figure 4:
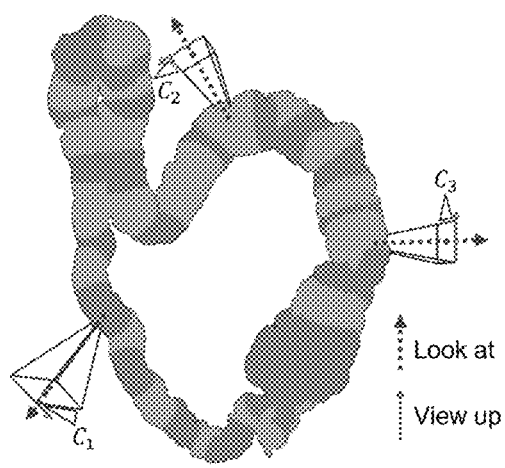
Figure 4:
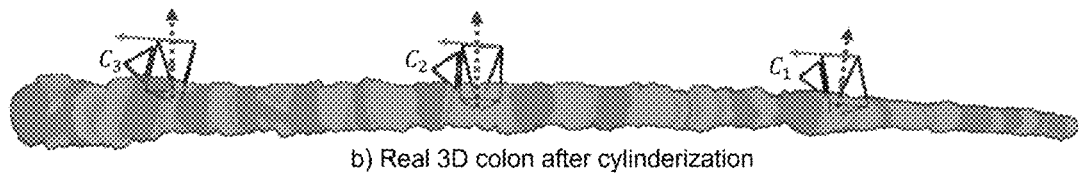
Figure 4:
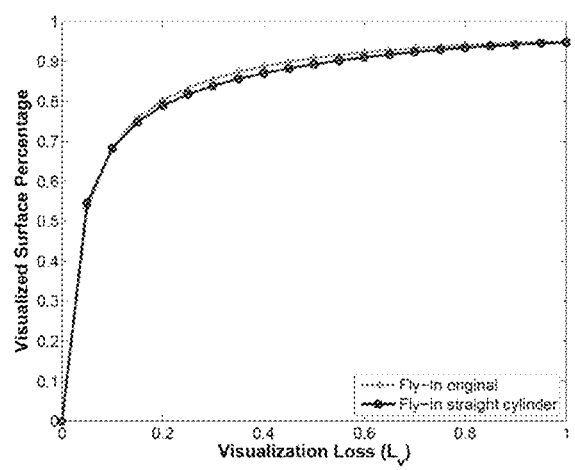

The present method corrects for the cameras' movement during navigation inside tubular shapes off the centerline. As shown in FIG. 4, the algorithm of the present method can be used in Computed Tomography Colonography (CTC). FIG. 4(a) shows the original 3D reconstructed colon. FIG. 4(b) shows the colon of FIG. 4(a) using the camera stabilization method of the present invention with the centerline of the 3D tubular object (the colon) embedded into a 2D plane. As shown by the graphic comparison in FIG. 4(c), the Fly-In performance using the present method demonstrates about the same of slightly less visualization loss than the Fly-In performance on the folded colon while providing shape that simplifies visualization for the viewer.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments±20%, in some embodiments±10%, in some embodiments±5%, in some embodiments±1%, in some embodiments±0.5%, and in some embodiments to ±0.1%, from the specified amount, as such variations are appropriate in the disclosed application.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A method for transforming three-dimensional (3D) visualization data from a tubular object into a planar image, wherein the method comprises:
 a. Acquiring, from at least one rig of virtual cameras, a plurality of images that provide 360° visualization of a cylindrical region of interest (ROI), wherein the rig of virtual cameras is positioned on a centerline, and wherein the images define a cylindrical ring mesh and wherein the images comprise at least one look-at vector ($\overrightarrow{look}$) and at least one view-up vector ($\overrightarrow{up}$);
b. Unfolding the 3D tubular object by maintaining constant $\overrightarrow{look}$ and $\overrightarrow{up}$ vectors without regard to camera position;
c. Fitting a generalized cylinder to each cylindrical ring mesh, wherein each cylindrical ring mesh has at least one mesh vertex;
d. Computing rotation minimizing frames (RMF) to generate a set of initial director frames defined by axes $\{T(s), U(s), V(s)\}$;
e. Parametrizing each mesh vertex by $(s, \sigma)$, wherein s is a value and $0 \leq s \leq 1$, and wherein $\sigma$ is given by the rotation angle of $\alpha$ vector $v_i - c(s)$ about $T(s)$ measured about the $U(s)$ axis, wherein $v_i$ is a mesh vertex of the cylindrical ring mesh and $c(s)$ is a parametrized line modeled for the cylindrical ring mesh;
f. Defining a first torsion energy before unfolding and defining a second torsion energy after unfolding;
g. Calculating a torsion energy differential by using the first torsion energy and the second torsion energy;
h. Using an optimization method to find a 3D mesh that satisfies the smallest torsion energy differential and transforming the centerline to conform with the 3D mesh;
i. Establishing a path for camera rig movement along the transformed centerline such that the virtual camera has a translation parallel to the centerline, wherein the path is defined as a plurality of neighboring positions along the centerline;
j. Moving the camera rig to the neighboring position along the path;
k. Repeating steps (a)-(i) until camera stabilization is reached, and generating a composite planar image of the tubular object.

2. The method of claim 1 wherein the tubular object is a colon.

3. The method of claim 1 wherein the plurality of images that provide 360° visualization of a cylindrical ROI is acquired from Virtual Colonoscopy (VC) or from Computed Tomography Colonography (CTC).

4. The method of claim 1 further including a step to measure visualization loss.

5. The method of claim 1 wherein the plurality of images that provide 360° visualization of a cylindrical ROI is acquired from Fly-In visualization.

* * * * *